(12) United States Patent
Ghosh et al.

(10) Patent No.: US 8,447,689 B2
(45) Date of Patent: May 21, 2013

(54) CALCULATING CREDIT WORTHINESS USING TRANSACTIONAL DATA

(75) Inventors: Debashis Ghosh, Charlotte, NC (US); William A. Nobili, Charlotte, NC (US); Arun R. Pinto, Charlotte, NC (US); Kurt D. Newman, Matthews, NC (US); David N. Joffe, Charlotte, NC (US); Sudeshna Banerjee, Waxhaw, NC (US); Marc Douglas Halsted, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/441,309

(22) Filed: Apr. 6, 2012

(65) Prior Publication Data

US 2012/0197782 A1    Aug. 2, 2012

Related U.S. Application Data

(63) Continuation of application No. 12/645,277, filed on Dec. 22, 2009, now Pat. No. 8,190,515, which is a continuation of application No. 11/740,130, filed on Apr. 25, 2007, now Pat. No. 7,734,539.

(51) Int. Cl.
   *G06Q 40/00*         (2012.01)
(52) U.S. Cl.
   USPC .......................................................... 705/38
(58) Field of Classification Search
   USPC .......................................................... 705/38
   See application file for complete search history.

(56) References Cited

U.S. PATENT DOCUMENTS

| | | | |
|---|---|---|---|
| 5,930,776 | A | 7/1999 | Dykstra et al. |
| 6,658,393 | B1 | 12/2003 | Basch et al. |
| 6,764,003 | B1 | 7/2004 | Martschitsch et al. |
| 2002/0095363 | A1* | 7/2002 | Sloan et al. .................... 705/36 |
| 2002/0138418 | A1 | 9/2002 | Zarin et al. |
| 2002/0198822 | A1 | 12/2002 | Munoz et al. |
| 2004/0049402 | A1 | 3/2004 | Dojo et al. |
| 2004/0177030 | A1 | 9/2004 | Shoham |
| 2004/0186807 | A1 | 9/2004 | Nathans et al. |
| 2005/0010506 | A1 | 1/2005 | Bachann |
| 2005/0177501 | A1 | 8/2005 | Thomas |
| 2005/0187860 | A1* | 8/2005 | Peterson et al. ................ 705/38 |
| 2005/0273430 | A1* | 12/2005 | Pliha ............................... 705/42 |
| 2006/0161487 | A1 | 7/2006 | Saxena et al. |
| 2006/0242047 | A1 | 10/2006 | Haggerty et al. |
| 2007/0156554 | A1 | 7/2007 | Nikoley et al. |

OTHER PUBLICATIONS

Secondary markets explain credit score: Taylor, Marshal. Real Estate Finance Today 13.7(Apr. 1, 1996):16.*
Brokers cautioned About overreliance on Credit Scoring; La Monica, Paul R. American Banker [New York, N.Y] Jun. 26, 1997: 11:1.*

(Continued)

*Primary Examiner* — Hani M Kazimi
*Assistant Examiner* — Hatem M Ali
(74) *Attorney, Agent, or Firm* — Banner & Witcoff, Ltd.; Michael A. Springs

(57) ABSTRACT

Aspects of the invention provide for the use of transactional data in determining credit and product offerings. Further aspects of the invention provide for generating financial statements and indices using transactional data for use by users and/or financial institutions. The transactional based financial statements and indices may be used for making underwriting and financial planning decisions.

20 Claims, 7 Drawing Sheets

OTHER PUBLICATIONS

Souses share liability for each other's credit debts:[Morning Edition]: Edmond Sanders: The Orange County Register [Santa Ana, Calif] Mar. 30, 1998:d05.*
PCT International Search Report, PCT/US08/61425, mailed Jan. 15, 2009, 9 pages.
PCT International Preliminary Report on Patentability, PCT/US2008/061425, mailed Nov. 5, 2009, 7 pages.
Value Checking Accounts, The Business of Valuing Checking Accounts and Scoring Consumer Risk, Critical Point Group, Inc., http://www.criticalpointgroup.com/valuingchecking.html, downloaded Mar. 15, 2007, 2 pages.
Supplemental European Search Report, Application No./Patent No. 08746786.6-2221/2140422 PCT/US20008061425, dated Feb. 15, 2012, 6 pages.
Chinese Office Action mailed Apr. 26, 2011, Chinese Patent Application 200880022066.3, 18 pages.
Credit cards could have no limits [Transaction would not work unless funds were previously transffered into credit card bank account], Boufford, John, ComputerWorld Canada, NorthYork; Oct. 20, 2000, vol. 16, Iss. 21; http://proquest.umic.om/pgdweb?index=27&sid=4&srchmode=1&vinst-PROD&fmt=3&st . . . , downloaded Sep. 6, 2011, 2 pages.
E3 Corp. Acquires Market Data Solutions, Inc. and eMillenium, Inc. to Take Demand-based Inventory Forecasting to the Next Level, PR Newswire, New York, Apr. 17, 2000, http://proquestumic.om/pgdweb?index=0&sid=6&srchmode=1&vinst-PROD&fmt=3&st . . . , downloaded Sep. 6, 2011, 3 pages.
European Search Report, Application No. 11167182.2-1238, dated Oct. 19, 2011, 8 pages.
New Zealand Patent Office Examination Report, Patent Application No. 580698, dated Apr. 13, 2011, 3 pages.
Lengyel, Zoltan, International Financial Law Review, v19n5 PP; 73; May 2000, ISSN 0262-69689, JRNL CODE: IFL.
Kelly J. Andrews, Target Marketing, v. 23, n. 1, p. 22; Jan. 2000.
Copyright Phillips Business Information, Inc.; Credit Risk Management Report, v9, n3, pNA; Feb. 22, 1999.
Scientific and Technical Information Center; EIC 3600 Search Results, pp. 1-89, Nov. 4, 2009.

* cited by examiner

| | |
|---|---|
| Payroll Direct Deposit — 312 | 5000 |
| Additions to Cash (Inflow) | |
| Transfer from other Financial Institutions — 314 | 100 |
| Other Deposits (Dividends and Interest) — 316 | 400 |
| Subtraction From Cash (Outflow) | |
| Mortgage — 318 | 2500 |
| Utilities — 320 | 100 |
| Electricity — 322 | 100 |
| Gas — 324 | 50 |
| Water / Sewer — 325 | 100 |
| Cable — 326 | 100 |
| Phone — 328 | 150 |
| Insurance — 330 | 400 |
| Grocery — 332 | 200 |
| Gas — 334 | 50 |
| Gym — 336 | |
| Investment Account* — 338 | 1000 |
| Other Debt (Credit card, Student Loans) — 340 | 200 |
| Cash Flow For EOM Jan 2007 — 313 | 850 |

FIG. 3

Life Event Summary

702 — Beginning of Retirement: Start of social security, pension or annuity payments.

704 — New Customer/Job: New payroll direct deposit.

706 — New Employer: Change in existing direct deposit (new payer).

708 — Big Raise: Change in dollar amount of direct deposit.

710 — Lost/Quit Job: Cessation of direct deposit. Start of unemployment direct deposits.

712 — Birth of a Baby

714 — Marriage

716 — Divorce

718 — Death of a family Member

FIG. 7

CALCULATING CREDIT WORTHINESS USING TRANSACTIONAL DATA

This application is a continuation application of co-pending application Ser. No. 12/645,277, filed Dec. 22, 2009, which is a continuation of application Ser. No. 11/740,130 (now U.S. Pat. No. 7,734,539), filed Apr. 25, 2007. All of the above disclosures are hereby incorporated by reference in their entireties.

FIELD OF THE INVENTION

Aspects of the disclosure relate to using financial transactional data to assist in extending credit and product offerings. More specifically, aspects of the invention relate to generating customer financial statements based on transactional data.

BACKGROUND

Currently, transactional data is not utilized in preparing real-time personal financial statements or indices which may assist a customer or financial institution to understand a customer's financial position. For example, personal cash flow and net worth statements for a customer are not presently created from each customer using transactional data. Such information would be useful in assisting a financial institution gauge the current credit worthiness of the customer.

Financial institutions such as banks extend credit to customers in the form of different types of loans. The determination of whether a customer should be extended credit is currently based on a FICO centric based underwriting system. A FICO centric based underwriting system uses a FICO scoring methodology along with other attributes such as Triad Score and Bankruptcy score. FICO continues to be the dominant factor in credit decision making but other factors such as Triad Score are considered as well. A calculated score assists the financial institution in determining whether credit should be extended to a customer and if so at an appropriate interest rate.

Similarly, other credit scoring systems exist which use similar information to calculate credit scores for potential customers however, these credit scoring systems and the FICO scoring methodology may not provide an accurate representation of the credit worthiness of a customer. All of these scoring systems use a fixed scoring methodology which does not take into account current transactional data which may provide additional insight into the credit worthiness of a customer. Using the existing FICO scoring methodology may unnecessarily deny customers credit or particular financial institution products.

Additional information regarding a customer's financial position would also be useful in determining the extent of credit and/or particular products to be offered to specific customers. For instance, cash flow refers to the movement of cash over a particular time period. The calculation of cash flow may be used as one measure to gauge financial health of a customer. Good cash flow projections involve using up-to-date accurate data regarding inflows and outflows of cash over a period of time. Similarly, net worth calculations may be used to assist in determining a customer's financial health. Net worth calculations involve determining a customer's financial position by subtracting the customer's liabilities from their assets.

Therefore, a need exists for an improved method and system of determining the credit worthiness of potential customers.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In one aspect of the invention, transactional data may be used in generating financial statements. Transactional based financial statements may provide beneficial information for both customers and financial institutions in determining appropriate credit and/or product offerings. The financial statements may include cash flow and net worth statements. The generated financial statements may be weighted and used to determine the credit worthiness of a customer. A loan may be originated based on the determined credit worthiness of the customer.

Furthermore, in another aspect of the invention transactional data may be used to determine a percentage of a customer's financial requirements that is being filled by particular brands, products, or services provided by a financial institution. The percentage may describe the percentage share of a customer's wallet a particular financial institution may be provided to the customer.

BRIEF DESCRIPTION OF THE DRAWINGS

The present disclosure is illustrated by way of example and not limited in the accompanying figures in which like reference numerals indicate similar elements.

FIG. 3 illustrates a cash flow statement in accordance with an aspect of the invention.

FIG. 7 illustrates exemplary life events which may indicate an improvement or deterioration in the health and product needs of individual customers in accordance with an aspect of the invention.

DETAILED DESCRIPTION

In accordance with various aspects of the disclosure, systems and methods are illustrated for generating transactional financial statements and indices. A financial institution such as a bank may utilize customer transactional data to assist in credit decisions and/or product offerings.

Figure 1:
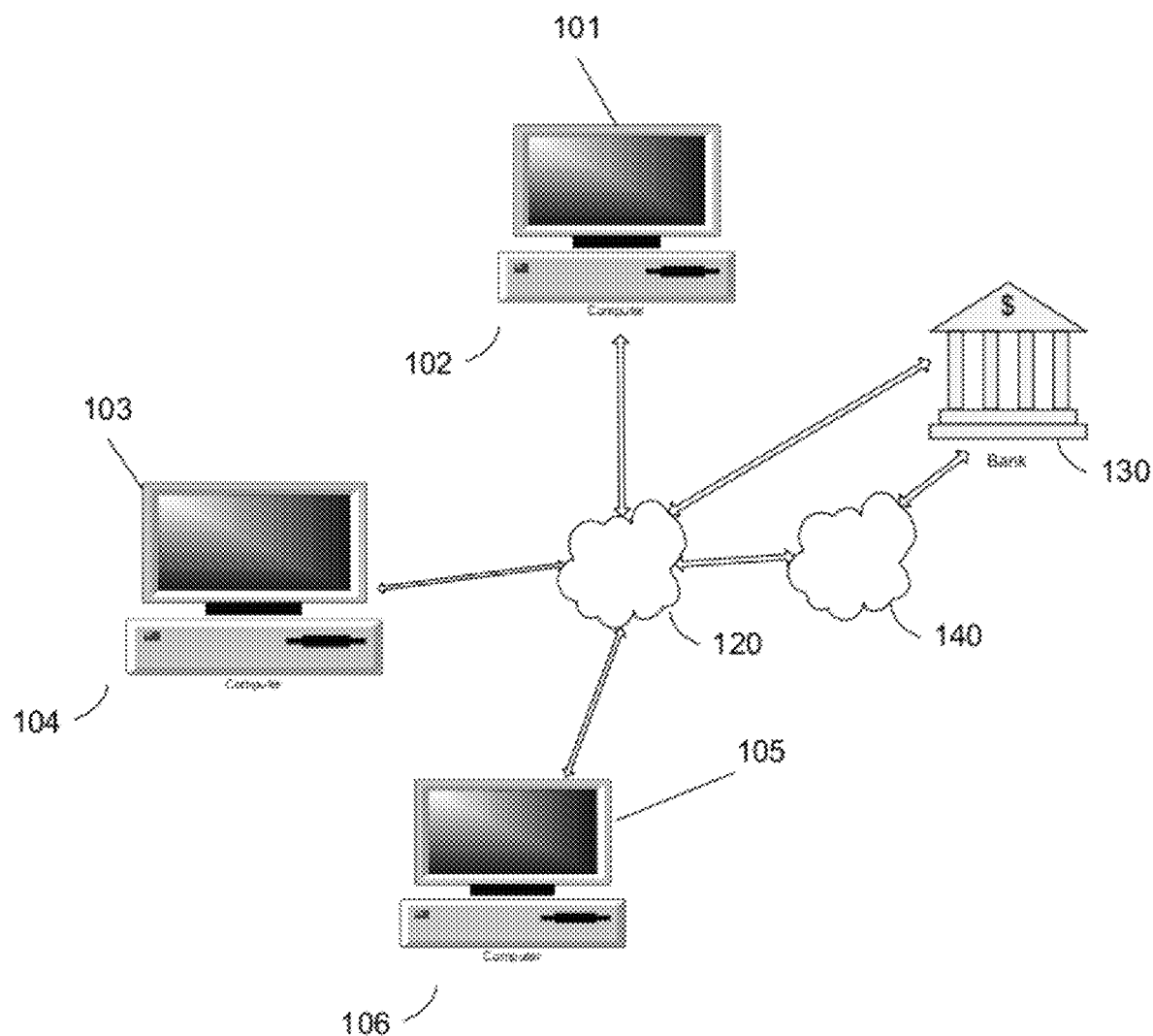
FIG. 1 illustrates an example of a suitable operating environment in which various aspects of the invention may be implemented.

FIG. 1 illustrates an example of a suitable operating environment in which various aspects of the disclosure may be implemented. Computers 102, 104, 106 may be located at various locations such as locations 101, 103, and 105. The location may be internal or external to a financial institution such as a bank 130. Computers 102, 104, 106 may be transactional computers or terminals found on various internal and external networks. The computers 102, 104, 106 may contain transactional information for numerous customers. Such transactional data may include credit and debit card transactions, electronic bill payment transactions, and demand deposit account transactions. Those skilled in the art will realize that additional computers may be included and that those described below in the illustrative embodiments are not intended to be limiting of the scope of the invention. Furthermore, the transactional data may also include numerous other types of customer transactional data which may be used in various embodiments of the invention FIG. 1 further illustrates computers 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Computers 102, 104, and 106 may communicate with one another or with a financial institution such as bank 130 via communication network 120 in ways that are well known in the art. The existence of any of various well-known protocols, such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like may be used as the communications protocol. Communications network 120 may be directly connected to a financial institution such as bank 130. In another embodiment, communications network 120 may be connected to a second network or series of networks 140 before being connected to bank 130.

Figure 2:
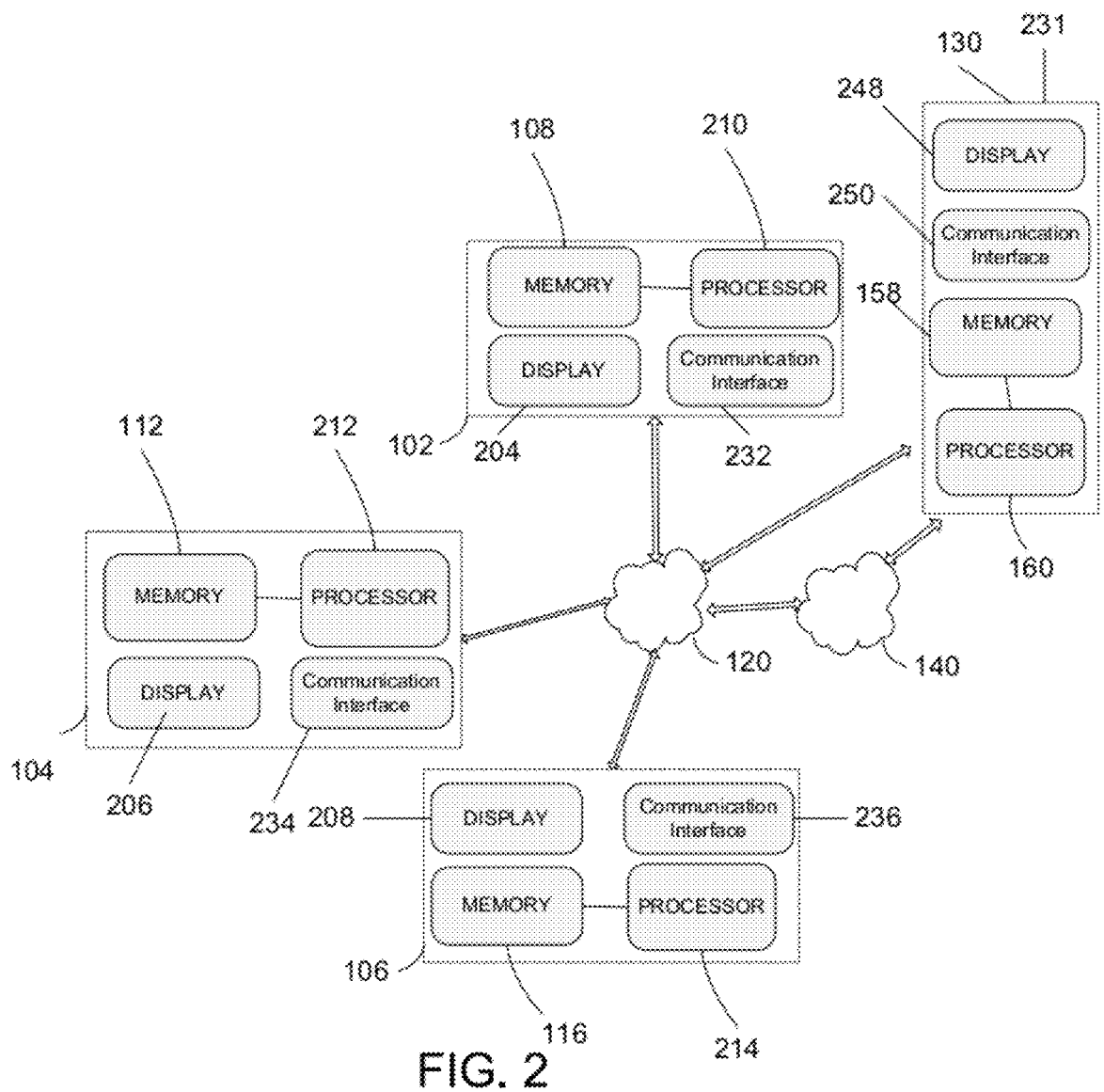
FIG. 2 illustrates a simplified diagram of a transactional computer in accordance with an aspect of the invention.

FIG. 2 illustrates a simplified diagram of a computer in accordance with an aspect of the invention. The computers may comprise memories (108, 112, and 116) processors (210, 212, and 214), displays (204, 206, and 208), and communication interfaces (232, 234, and 236). The processors 210, 212, and 214 may execute computer-executable instructions present in memory 108, 112, 116 such that, for example, computer 102, 104, and 106 may send and receive information to and from bank 130 via network or networks 120 and/or 140. Bank 130 may utilize an infrastructure which includes a server 231 having components such as memory 158, processor 160, display 248, and communication interface 250. The memory for each of the computers 102, 104, and 106 and server 231 may include non-volatile and/or volatile memory.

FIG. 3 illustrates a cash flow statement in accordance with an aspect of the invention. In FIG. 3, a cash flow statement 302 for a customer 304 is displayed. The cash flow statement 302 uses transactional data 306 which may be received from numerous internal and external systems. For example, transactional data 306 may include checking account transactions, electronic bill payments transactions, and/or credit/debit card transactions. As shown, the cash flow statement 302 may be calculated as the amount of cash receipts or inflows 308 minus the cash payments or outflows 310 over a given period of time.

A beginning cash flow 312 of $5,000 and an ending cash flow 313 of $550 are illustrated in FIG. 3. The beginning cash flow 312 may represent a payroll direct deposit for the customer. The inflows 308 which are added to the beginning cash flow 312 may include a "transfer from other financial institutions" 314, "other deposits (dividends and interest)" 316. The outflows 310 which are subtracted from the inflows 308 may include a mortgage payment 318, and various utility payments 320 such as an electric payment 322, a gas payment 324, a water/sewer payment 325, a cable payment 326, and a phone payment 328. Additional outflows 310 may include an insurance payment 330, a grocery payment 332, a gasoline payment 334, a gym payment 336, an investment account deposit 338, and "other debt (credit card, student loans)" 340.

Those skilled in the art will realize that the inflows 308 and outflows 310 illustrated in FIG. 3 are merely exemplary and that numerous additional and different inflows and outflows are possible. For example, additional inflows may include salary checks, dividends, bonuses, and prize winnings, whereas, outflows may include regular and intermittent bill payments.

The cash flow statement 304 may be used to measure the financial strength or leverage of a customer. A positive cash flow for instance proactively indicates favorable financial health contrary to a negative cash flow. As shown in FIG. 3, customer 304 has a positive cash flow of $550 "313."

Figure 4:
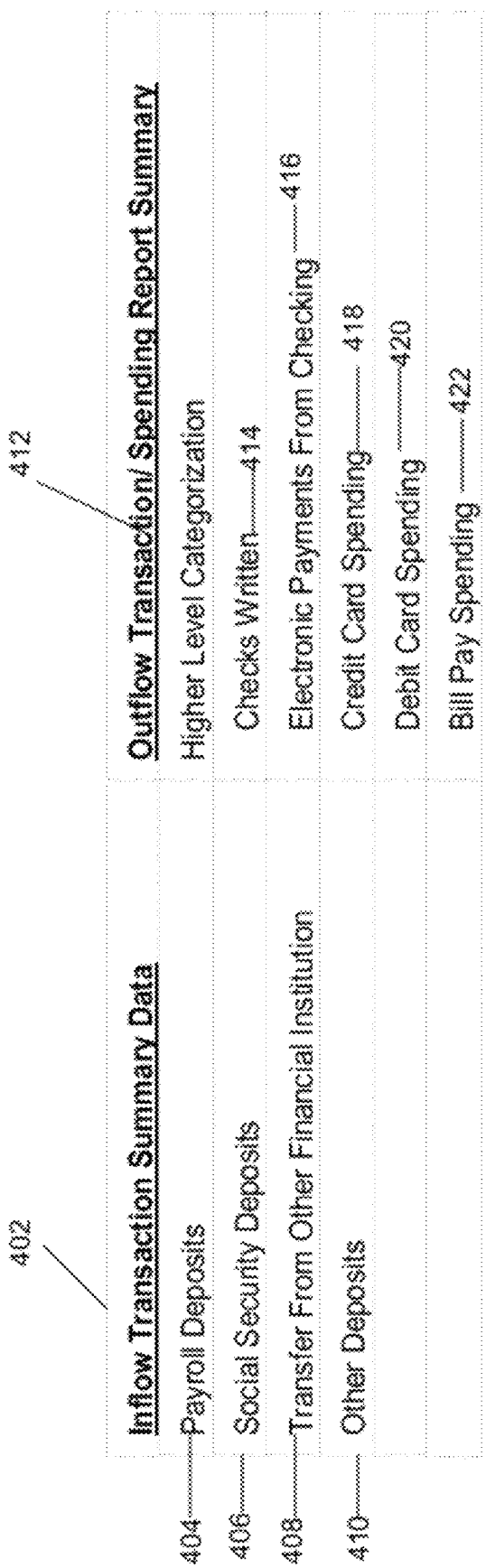
FIG. 4 illustrates categorization of inflows and outflows of a cash flow statement in accordance with an aspect of the invention.

FIG. 4 illustrates categorization of inflows and outflows of a cash flow statement in accordance with an aspect of the invention. In FIG. 4, inflows 402 may be categorized into various groups such as payroll deposits 404, social security deposits 406, transfers from other financial institutions 408, and other deposits 410. Similarly, FIG. 4 illustrates that the outflows 412 may be categorized into various groups such as a checks written 414, electronic payments from checking 416, credit card spending 418, debit card spending 420, and bill pay spending 422. The various categories for both inflows 402 and outflows 412 may simplify the cash flow statements and provide information on various similar transactions so that additional analysis may be preformed. Those skilled in the art will realize that additional groups may be created based on the similarity of the underlying transactions.

In another aspect of the invention, a proxy net worth statement may be generated on a customer level in accordance with an aspect of the invention. The proxy net worth statement may include a listing of assets and liabilities of the customer along with the calculated difference between the assets and liabilities.

In another embodiment of the invention, the proxy net worth computation may focus on cash inflows directly into a financial institution as well as cash outflows directly towards investments and savings accounts held at other external financial institutions. The net worth computation may include attributes such as asset valuation based on dividend check deposits, amount directed into investment and brokerage accounts, and equity estimation in real estate.

The proxy net worth calculation may provide an improved picture of a customer financial position. For example, a monthly average of $550 in a checking account could mean that 1) A person's real average balance is $550—in credit decisioning terms this customer may not be credit worthy, or 2) a person's average balance is $550, but they have investments and savings in other instruments/accounts located in other financial institutions as well as the current financial institution. In the second case, the existence of additional investments and saving accounts at other financial institutions may indicate that the person is credit worthy and enable the customer to apply for additional credit.

In another aspect the invention, the net worth statement may include dividend check deposits. Based on the amount of the dividend check, a calculation of the total amount of assets held by the customer associated with the dividend check may be calculated. For example, if a customer deposits a dividend check in the amount $750 from Company ABC, and if the ABC company has paid a 5% dividend to shareholders, then the amount of assets held by a customer in Company ABC may determined as $15,000 worth of assets (stocks). This information may be used to determine the credit worthiness of a customer.

Figure 5:
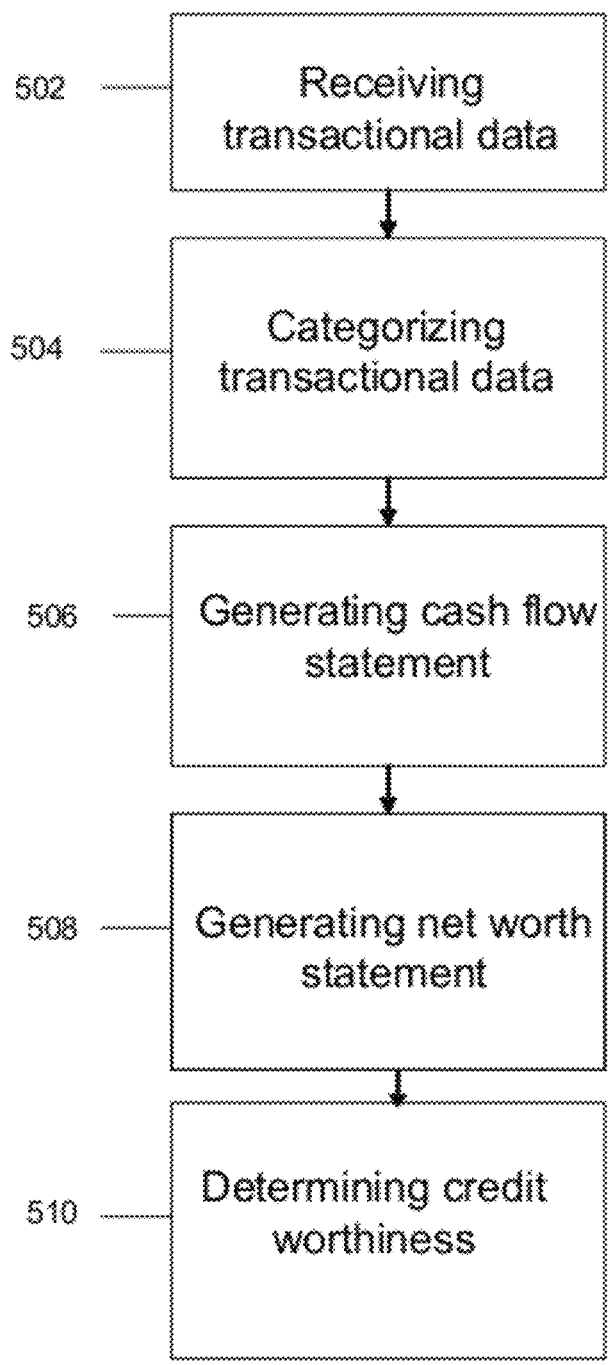
FIG. 5 illustrates a method of determining credit worthiness of a customer in accordance with an aspect of the invention.

FIG. 5 illustrates a method of determining credit worthiness of a customer in accordance with an aspect of the invention. In FIG. 5, transactional data corresponding to transactions relating to the customers accounts are received in step 502. The transactional data may include various transactions such as credit and debit card transactions, electronic bill payment transactions, and checking and saving account transactions. The transactions may be categorized into various groups of inflows and outflows as shown in step 504. In step 506, a cash flow statement may be generated based on the categorized transactional data. Next, in a step 508 a net worth statement may be generated using the transactional data. Based on the generated cash flow statement and net worth statement credit worthiness of a customer may be determined in step 510. Based on the credit worthiness a loan or credit limit increase may be approved for the customer.

In another aspect of the invention, the generated cash flow and the net worth statement may be weighted and used to determine credit worthiness of a customer. The weighting of a cash flow statement may range from ten percent to eighty percent depending upon various factors such as the number of months of historical data available regarding the particular customer. Similarly, the weighting of the net worth statement may also range from thirty percent to fifty percent. Those skilled in the art will realize that the weighting of both cash flow statement and net worth statement may be adjusted in numerous different embodiments such that that the combined weight equals one hundred percent. Furthermore, those skilled in the art will realize that the completeness of the data may influence the weightings. For example, a person having a significant brokerage balance but only having a few transactions (totaling a few hundred dollars) related to other customer accounts may indicate that this person may have their primary transactional accounts with another entity. In this example, the weighting of the net worth statement may be a higher percentage of the total weight than that of the cash flow statement with the total weight still equaling one hundred percent. In one aspect to the invention, both the cash flow statement and the net worth statement are equally weighted.

In yet another aspect of the invention, a FICO score may be generated for the customer in accordance with an aspect of the invention. The FICO score may be used along with the generated cash flow and net worth statement to determine credit worthiness of a customer. For example, a customer with a $100,000 net worth and FICO score of 630 may be assumed not to be as risky as a customer with zero or negative net worth and a FICO score of 630.

In another embodiment, the FICO score along with the generated cash flow and net worth statement may be weighted and used to determine the credit worthiness of the customer.

Figure 6:
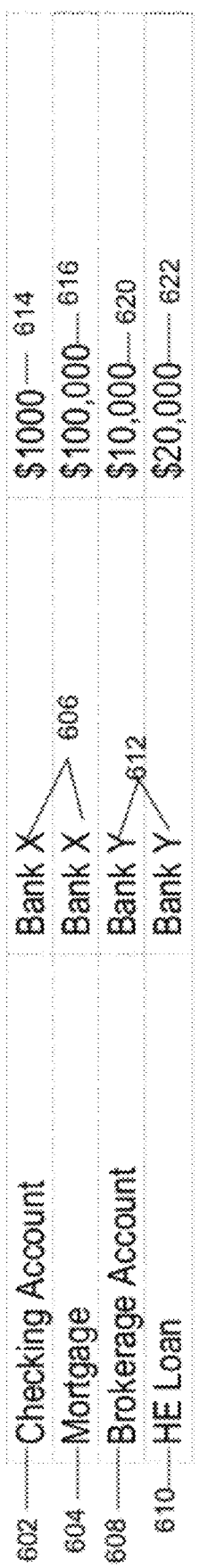
FIG. 6 illustrates calculating a share of customer's wallet in accordance with an aspect of the invention.

In another aspect of the invention, a share of wallet may be calculated in accordance with an aspect of the invention. The share of wallet may indicate a percentage of a customer's financial requirement that is filled by a particular brand of product or service offered by a financial institution. For instance, FIG. 6 illustrates share of wallet calculations for a customer. As shown in FIG. 6, a customer may have a checking account 602 and a mortgage 604 with Bank X 606. Additionally, a customer may have a brokerage account 608 and HE loan 610 with Bank Y 612. As shown in FIG. 6, each of the accounts has a balance. For example, the checking account has a balance of $1000 "614." The mortgage 604 has a remaining principal amount of $100,000 "616." The brokerage account has a balance of $10,000 "620." The HE loan has a balance of $20, 000 "622." In this example, the unweighted share of wallet of Bank X is 50% since a customer has exposure to two financial institutions, bank X 606 and Y 612. However, the dollar weighted share of wallet for the customer is 71% or said otherwise, 71% of the customers financial requirements are filled by Bank X.

In another embodiment, aggregation of demand deposit account transactions into distinct segments may provide the ability to estimate share of wallets for financial institutions. The share of wallet information may also be used as an additional factor in determining the credit worthiness of a customer.

In another aspect of the invention, life event profiling may be used as an additional factor to determine credit worthiness of a customer. Life event profiling may provide early warning indicators of either an improvement or deterioration in the health and product needs of individual customers. FIG. 7 illustrates exemplary life events in accordance with an aspect of the invention. For example, life events may include: beginning of retirement, pension or annuity payments 702, a new job or customer as evident from payroll deposits 704, a new employer as evident from payroll source 706, a significant raise as evident from payroll deposits 708, job loss or voluntary termination of employment evident from cessation of payroll deposits 710, birth of a baby 712, marriage 714, divorce 716, and/or death of a family member 718.

Life events may impact cash flow as well as alter product needs of individual customers. Being able to proactively profile those changes creates information driven capabilities for a financial institution to proactively execute on product customization and offerings. The life event information may also be used as an additional factor in determining the credit worthiness of a customer.

In another aspect of the invention, a determination of whether a particular customer checking account is the customer's primary checking account may be made in accordance with an aspect of the invention. A customer might have multiple checking accounts with different financial institutions. To include a checking account which is not the primary checking account might distort the sampling process. To keep such accounts out of the mix, the following techniques may be used to detect whether the account is the primary checking account.

For instance, the checking account may be monitored for the amount and intervals of payroll deposits. The assumption here is that bulk of a customer's salary may be deposited in the primary checking account. Furthermore, all payment made from the account may be tracked to determine whether monthly payments such as mortgage/rent, utility payment and other similar overhead payments are made from the primary checking account. An assumption may be made that in most cases the monthly housing costs are paid from the primary checking account. Furthermore, a confidence number (0 to 100) may be generated. If the confidence score is high then information derived from the cash flow statement, proxy net worth, share of wallet and life event profiling may be deemed reliable and as such used for credit decisioning.

In an additional aspect of the invention, transactional based indices along with the transactional based financial statements may be used in determining credit worthiness of a customer. In various aspects of the invention, the indices may include a luxury ratio index, a discretionary index, a travel and entertainment index, a necessity index, and a relative customer purchase risk profile index.

In an aspect of the invention, a customer's transactions may be categorized into a number of different categories. The categories may allow for segmentation of the data and provide useful data trends over time. The categories may include:
1. Airlines
2. Automobiles
3. Brokerage
4. Business Income
5. Business Contractors/Supply
6. Cash
7. Charities & Donation
8. Coffee Stores
9. Computer Hardware/Software
10. Craft stores
11. Drug Stores/Pharmacy
12. Debt Payments (not including Credit Cards with zero revolving balance)
13. Education (Schools, Colleges, Universities, Vocational)
14. Electronic Stores, retailers (online retailers)
15. Entertainment
16. Financial Services
17. Fitness
18. Gas Stations
19. Grocery Stores
20. Hair Care
21. Health care
22. Home Improvement Stores
23. Income
24. Insurance
25. Internet Service Providers
26. Lodging
27. Magazine Subscriptions
28. Mortgage Debt Payments
29. Other Income
30. Parking
31. Pet Stores
32. Phone Service
33. Prepaid Cards
34. Rental Cars
35. Restaurants
36. Discount Retailers
37. Non-Discount Retailers
38. Retirement Income
39. Satellite TV/Cable TV
40. Small Businesses
41. Smoothie Stores
42. Travel Services
43. Utilities
44. Wireless Phone Service Those skilled in the art will realize that the above list of categories is not exhaustive but rather an exemplary listing. Each of the indices along with various embodiments for each index is discussed below.

In an aspect of the invention, a luxury ratio index may be calculated in accordance with an aspect of the invention. The luxury ratio index measures the relative number of luxury and necessity purchases made by the customer. The sum of the number and dollar amount for transactions believed to be luxury (shown in the list below) are divided by the sum of the number and dollar amount for transactions believed to be predominately necessity (shown in the list below).

Luxury
 Airlines
 Entertainment
 Lodging
 Rental Cars
 Restaurants
 Retailers—Up Scale
 Travel Services Necessity
 Debt Payments
 Gas Stations
 Grocery Stores
 Healthcare
 Insurance
 Mortgage Debt Payments
 Utilities—Household electricity, gas, water In another embodiment of the invention, a luxury ratio risk index (number and dollar) may be calculated in accordance with an aspect of the invention. The luxury ratio risk index may adjust the luxury ratio index using information on income and debt payments. Customers with a large percent of their income required for debt payments may have a higher luxury ratio risk index than customers with the same luxury ratio index value, but require a small percent of their income for debt payments. The luxury ratio risk index may be calculated by multiplying the luxury ratio index by the percent of income required for debt payments.

In another embodiment of the invention, a luxury ratio income standardized risk index (number and dollar) may be calculated in accordance with an aspect of the invention. The luxury ratio income standardized risk index may refine the luxury ratio risk index based on income information. Customers with below average income levels may have higher luxury ratio income standardized risk index values. The luxury ratio income standardized risk index may be calculated by multiplying the luxury ratio risk index by the average income for all customers then divided by the income for the specific customer.

In another embodiment of the invention, a luxury ratio five month momentum index (number and dollar) may be calculated in accordance with an aspect of the invention. The luxury ratio five month momentum index may refine the luxury ratio index based on the five month rate of increase/decrease. The luxury ratio five month momentum index may be larger than the luxury ratio index for customers with increasing luxury ratio index values. The luxury ratio five month momentum index may be smaller than the luxury ratio index for customers with decreasing luxury ratio index values. The luxury ratio five month momentum index may be calculated by multiplying the luxury ratio risk index by the luxury ratio index rate of change over the previous five months.

In another embodiment of the invention, a luxury ratio five month momentum risk index (number and dollar) may be calculated in accordance with an aspect of the invention. The luxury ratio five month momentum risk index may refine the luxury ratio risk index based on the five month rate of increase/decrease. The luxury ratio five month momentum risk index may be larger than the luxury ratio risk index for customers with increasing luxury ratio index values. The luxury ratio five month momentum risk index may be smaller than the luxury ratio risk index for customers with decreasing luxury ratio index values. The luxury ratio five month momentum risk index may be calculated by multiplying the luxury ratio risk index by the luxury ratio index rate of change over the previous five months.

In another embodiment of the invention, a luxury ratio income standardized five month momentum risk index (number and dollar) may be calculated in accordance with an aspect of the invention. The luxury ratio income standardized five month momentum risk index may refine the luxury ratio five month momentum risk index based on income information. Customers with below average income levels may have higher luxury ratio income standardized five month momentum risk index values. The luxury ratio income standardized five month momentum risk index may be calculated by multiplying the luxury ratio five month momentum risk index by the average income for all customers then divided by the income for the specific customer.

In another embodiment of the invention, a luxury ratio three month momentum index (number and dollar) may be calculated in accordance with an aspect of the invention. The luxury ratio three month momentum index may refine the luxury ratio index based on the three month rate of increase/decrease. The luxury ratio three month momentum index may be larger than the luxury ratio index for customers with increasing luxury ratio index values. The luxury ratio three month momentum index may be smaller than the luxury ratio index for customers with decreasing luxury ratio index values. The luxury ratio three month momentum index may be calculated by multiplying the luxury ratio index by the luxury ratio index rate of change over the previous three months.

In another embodiment of the invention, a luxury ratio three month momentum risk index (number and dollar) may be calculated in accordance with an aspect of the invention. The luxury ratio three month momentum risk index may refine the luxury ratio risk index based on the three month rate of increase/decrease. The luxury ratio three month momentum risk index may be larger than the luxury ratio risk index for customers with increasing luxury index values. The luxury ratio three month momentum risk index may be smaller than the luxury ratio risk index for customers with decreasing luxury ratio index values. The luxury ratio three month momentum risk index may be calculated by multiplying the luxury ratio risk index by the luxury index rate of change over the previous three months.

In another embodiment of the invention, a luxury ratio income standardized three month momentum risk index (number and dollar) may be calculated in accordance with an aspect of the invention. The luxury ratio income standardized three month momentum risk index may refine the luxury ratio three month momentum risk index based on income information. Customers with below average income levels may have higher luxury ratio income standardized three month momentum risk index values. The luxury ratio income standardized three month momentum risk index may be calculated by multiplying the luxury ratio three month momentum risk index by the average income for all customers then divided by the income for the specific customer.

In another embodiment of the invention, a luxury ratio momentum trend index (number and dollar) may be calculated in accordance with an aspect of the invention. The luxury ratio momentum trend index may refine the luxury ratio index based on the ratio of three month to five month rate of increase/decrease. The luxury ratio momentum trend index may be larger than the luxury ratio index for customers with luxury ratio three month momentum index values that are greater than the luxury ratio five month momentum index. The luxury ratio momentum trend index may be smaller than the luxury ratio index for customers with luxury ratio three month momentum index values that are less than the luxury ratio five month momentum index. The luxury ratio momentum trend index may be calculated by multiplying the luxury ratio index by the luxury ratio index rate of change over the previous three months then divided by the luxury ratio index rate of change over the previous five months.

In another embodiment of the invention, a luxury ratio momentum trend risk index (number and dollar) may be calculated in accordance with an aspect of the invention. The luxury ratio momentum trend risk index may refine the luxury ratio risk index based on the ratio of three month to five month rate of increase/decrease. The luxury ratio momentum trend risk index may be larger than the luxury ratio index for customers with luxury ratio three month momentum risk index values that are greater than the luxury ratio five month momentum risk index. The luxury ratio momentum trend risk index may be smaller than the luxury ratio index for customers with luxury ratio three month momentum index values that are less than the luxury ratio five month momentum index. The luxury ratio momentum trend risk index may be calculated by multiplying the luxury ratio risk index by the luxury ratio index rate of change over the previous three months then divided by the luxury ratio index rate of change over the previous five months.

In another embodiment of the invention, a luxury ratio income standardized momentum trend risk index (number and dollar) may be calculated in accordance with an aspect of the invention. The luxury ratio income standardized momentum trend risk index may refine the luxury ratio momentum trend risk index based on income information. Customers with below average income levels may have higher luxury ratio income standardized momentum trend risk index values. The luxury ratio income standardized momentum trend risk index may be calculated by multiplying the luxury ratio momentum trend risk index by the average income for all customers then divided by the income for the specific customer.

In an aspect of the invention, a discretionary index may be calculated in accordance with an aspect of the invention. The discretionary index estimates the percent of customer spending that may be discretionary. The sum of the number and dollar amount for transaction believed to be discretionary (shown is the list below) are divided by the sum of the number and dollar amount for all transactions.

Discretionary
  Airlines
  Coffee Stores
  Craft Stores
  Electronic Stores
  Entertainment
  Lodging
  Pet Stores
  Rental Cars
  Restaurants
  Retailers—Up Scale
  Smoothie Stores
  Travel Services In another embodiment of the invention, a discretionary risk index (number and dollar) may be calculated in accordance with an aspect of the invention. The discretionary risk index may adjust the discretionary index using information on income and debt payments. Customers with a large percent of their income required for debt payments may have a higher discretionary risk index than customers with the same discretionary index value, but require a smaller percent of their income for debt payments. The discretionary risk index may be calculated by multiplying the discretionary index by the percent of income required for debt payments.

In another embodiment of the invention, a discretionary income standardized risk index (number and dollar) may be calculated in accordance with an aspect of the invention. The discretionary income standardized risk index may refine the discretionary risk index based on income information. Customers with below average income levels may have higher discretionary income standardized risk index values. The discretionary income standardized risk index may be calculated by multiplying the discretionary risk index by the average income for all customers then dividing by the income for the specified customer.

In another embodiment of the invention, a discretionary five month momentum index (number and dollar) may be calculated in accordance with an aspect of the invention. The discretionary five month momentum index may refine the discretionary index based on the five month rate of increase/decrease. The discretionary five month momentum index may be larger than the discretionary index for customers with increasing discretionary index values. The discretionary five month momentum index may be smaller than the discretionary index for customers with decreasing discretionary index values. The discretionary five month momentum index may be calculated by multiplying the discretionary index by the discretionary index rate of change over the previous five months.

In another embodiment of the invention, a discretionary five month momentum risk index (number and dollar) may be calculated in accordance with an aspect of the invention. The discretionary five month momentum risk index may refine the discretionary risk index based on the five month rate of increase/decrease. The discretionary five month momentum risk index may be larger than the discretionary risk index for customers with increasing discretionary index values. The discretionary five month momentum risk index may be smaller that the discretionary risk index for customers with decreasing discretionary index values. The discretionary five month momentum risk index may be calculated by multiplying the discretionary index by the discretionary index rate of change over the previous five months.

In another embodiment of the invention, a discretionary income standardized five month momentum risk index (number and dollar) may be calculated in accordance with an aspect of the invention. The discretionary income standardized five month momentum risk index may refine the discretionary five month momentum risk index based on income information. Customers with below average income levels may have higher discretionary income standardized five month momentum risk index values. The discretionary income standardized five month momentum risk index may be calculated by multiplying the discretionary five month momentum risk index by the average income for all customers then dividing by the income for the specific customer.

In another embodiment of the invention, a discretionary three month momentum index (number and dollar) may be calculated in accordance with an aspect of the invention. The discretionary three month momentum index may refine the discretionary index based on the three month rate of increase/decrease. The discretionary three month momentum index may be larger than the discretionary index for customers with increasing discretionary index values. The discretionary three month momentum index may be smaller than the discretionary index for customers with decreasing discretionary index values. The discretionary three month momentum index may be calculated by multiplying the discretionary index by the discretionary index rate of change over the previous three months.

In another embodiment of the invention, a discretionary three month momentum risk index (number and dollar) may be calculated in accordance with an aspect of the invention. The discretionary three month momentum risk index may refine the discretionary risk index based on the three month rate of increase/decrease. The discretionary three month momentum risk index may be larger than the discretionary risk index for customers with increasing discretionary index values. The discretionary three month momentum risk index may be smaller than the discretionary risk index for customers with decreasing discretionary index values. The discretionary three month momentum risk index may be calculated by multiplying the discretionary index rate of change over the previous three months.

In another embodiment of the invention, a discretionary income standardized three month momentum risk index (number and dollar) may be calculated in accordance with an aspect of the invention. The discretionary income standardized three month momentum risk index may refine the discretionary three month momentum risk index based on income information. Customers with below average income levels may have higher discretionary income standardized three month momentum risk index values. The discretionary income standardized three month momentum risk index may be calculated by multiplying the discretionary three month momentum risk index by the average income for all customers then dividing by the income for the specific customer.

In another embodiment of the invention, a discretionary momentum trend index (number and dollar) may be calculated in accordance with an aspect of the invention. The discretionary momentum trend index may refine the discretionary index based on the ratio of three month to five month rate of increase/decrease. The discretionary momentum trend index may be larger than the discretionary index for customers with discretionary three month momentum index values that are greater than the discretionary five month momentum index. The discretionary momentum trend index may be smaller than the discretionary index for customers with discretionary three month momentum index values that are less than the discretionary five month momentum index. The discretionary momentum trend index may be calculated by multiplying the discretionary index by the discretionary index rate of change of the previous three months then dividing the discretionary index rate of change over the previous five months.

In another embodiment of the invention, a discretionary momentum trend risk index (number and dollar) may be calculated in accordance with an aspect of the invention. The discretionary momentum trend risk index may refine the discretionary risk index based on the ratio of three month to five month rate of increase/decrease. The discretionary momentum trend risk index may be larger than the discretionary index for customers with discretionary three month momentum risk index values that are greater than the discretionary five month momentum risk index. The discretionary momentum trend risk index may be smaller than the discretionary index for customers with discretionary three month momentum index values that are less than the discretionary five month momentum index. The discretionary momentum trend risk index may be calculated by multiplying the discretionary risk index by the discretionary index rate of change over the previous three months then dividing by the discretionary index rate of change over the previous five months.

In another embodiment of the invention, a discretionary income standardized momentum trend risk index (number and dollar) may be calculated in accordance with an aspect of the invention. The discretionary income standardized momentum trend risk may refine the discretionary momentum trend risk index based on income information. Customers with below average income levels may have higher discretionary income standardized momentum trend risk index values. The discretionary income standardized momentum trend risk index may be calculated by multiplying the discretionary momentum trend risk index by the average income for all customers then dividing by the income for the specified customer.

In an aspect of the invention, a travel and entertainment index (number and dollar) may be calculated in accordance with an aspect of the invention. The travel and entertainment index estimates the percent of customer spending that is travel and entertainment. The sum of number and dollar amount for transactions believed to be travel and entertainment (shown in the list below) are divided by the sum of the number and dollar amount for all transactions.

Travel and Entertainment
        Airlines
        Entertainment
        Lodging
        Rental Cars
        Restaurants
        Travel Services In another embodiment of the invention, a travel and entertainment risk index (number and dollar) may be calculated. The travel and entertainment risk index may adjust the travel and entertainment index using information on income and debt payment. Customers with a large percent of their income required for debt payments may have higher travel and entertainment risk index than customers with the same travel and entertainment index value, but require a small percent of their income for debt payments. The travel and entertainment risk index may be calculated by multiplying the travel and entertainment index by the percent of income required for debt payments.

In another embodiment of the invention, a travel and entertainment income standardized risk index (number and dollar) may be calculated. The travel and entertainment income standardized risk index may refine the travel and entertainment risk index based on income information. Customers with below average income levels may have higher travel and entertainment income standardized risk index values. The travel and entertainment income standardized risk index is calculated by multiplying the travel and entertainment risk index by the average income for all customers then dividing by the income for the specific customer.

In another embodiment of the invention, a travel and entertainment five month momentum index (number and dollar) may be calculated. The travel and entertainment five month momentum index may refine the travel and entertainment index based on the five month rate of increase/decrease. The travel and entertainment five month momentum index may be larger than the travel and entertainment index for customers with increasing travel and entertainment index values. The travel and entertainment five month momentum risk index may be smaller than the travel and entertainment risk index for customers with decreasing travel and entertainment index values. The travel and entertainment five month momentum index may be calculated by multiplying the travel and entertainment index by the travel and entertainment index rate of change of the previous five months.

In another embodiment of the invention, a travel and entertainment five month momentum risk index may be calculated. The travel and entertainment five month momentum risk index may refine the travel and entertainment index based on the five month rate of increase/decrease. The travel and entertainment five month momentum index may be larger than the travel and entertainment index for customers with increasing travel and entertainment index values. The travel and entertainment five month momentum index may be smaller than the travel and entertainment index for customers with decreasing travel and entertainment index values. The travel and entertainment five month momentum risk index may be calculated by multiplying the travel and entertainment index by the travel and entertainment index rate of change over the previous five months.

In another embodiment of the invention, a travel and entertainment income standardized five month momentum risk index (number and dollar) may be calculated. The travel and entertainment income standardized five month momentum risk index may refine the travel and entertainment five month momentum risk index based on income information. Customers with below average income levels may have higher travel and entertainment income standardized five month momentum risk index values. The travel and entertainment income standardized five month momentum risk index is calculated by multiplying the travel and entertainment five month momentum risk index by the average income for all customers then dividing by the income for the specific customer.

In another embodiment of the invention, a travel and entertainment three month momentum index (number and dollar) may be calculated. The travel and entertainment three month momentum index may refine the travel and entertainment index based on the three month rate of increase/decrease. The travel and entertainment three month momentum index may be larger than the travel and entertainment index for customers with increasing travel and entertainment index values. The travel and entertainment three month momentum risk index may be smaller than the travel and entertainment risk index for customers with decreasing travel and entertainment index values. The travel and entertainment three month momentum index may be calculated by multiplying the travel and entertainment index by the travel and entertainment index rate of change of the previous three months.

In another embodiment of the invention, a travel and entertainment three month momentum risk index may be calculated. The travel and entertainment three month momentum risk index may refine the travel and entertainment index based on the three month rate of increase/decrease. The travel and entertainment three month momentum index may be larger than the travel and entertainment index for customers with increasing travel and entertainment index values. The travel and entertainment three month momentum index may be smaller than the travel and entertainment index for customers with decreasing travel and entertainment index values. The travel and entertainment three month momentum risk index may be calculated by multiplying the travel and entertainment index by the travel and entertainment index rate of change over the previous three months.

In another embodiment of the invention, a travel and entertainment income standardized three month momentum risk index (number and dollar) may be calculated. The travel and entertainment income standardized three month momentum risk index may refine the travel and entertainment three month momentum risk index based on income information. Customers with below average income levels may have higher travel and entertainment income standardized three month momentum risk index values. The travel and entertainment income standardized three month momentum risk index is calculated by multiplying the travel and entertainment three month momentum risk index by the average income for all customers then dividing by the income for the specific customer.

In another embodiment of the invention, a travel and entertainment momentum trend index (number and dollar) may be calculated. The travel and entertainment momentum trend index may refine the travel and entertainment index based on the ratio of three month to five month rate of increase/decrease. The travel and entertainment momentum trend index may be larger than the travel and entertainment index for customers with travel and entertainment three month momentum index values that are greater than the travel and entertainment five month momentum index. The travel and entertainment momentum trend index may be smaller than the travel and entertainment index for customers with travel and entertainment three month momentum index values that are less than the travel and entertainment five month momentum index. The travel and entertainment momentum trend index may be calculated by multiplying the travel and entertainment index by the travel and entertainment index rate of change of the previous three months then dividing the travel and entertainment index rate of change over the previous five months.

In another embodiment of the invention, a travel and entertainment momentum trend risk index (number and dollar) may be calculated in accordance with an aspect of the invention. The travel and entertainment momentum trend risk index may refine the travel and entertainment risk index based on the ratio of three month to five month rate of increase/decrease. The travel and entertainment momentum trend risk index may be larger than the travel and entertainment index for customers with travel and entertainment three month momentum risk index values that are greater than the travel and entertainment five month momentum risk index. The travel and entertainment momentum trend risk index may be smaller than the travel and entertainment index for customers with travel and entertainment three month momentum index values that are less than the travel and entertainment five month momentum index. The travel and entertainment momentum trend risk index may be calculated by multiplying the travel and entertainment risk index by the travel and entertainment index rate of change over the previous three months then dividing by the travel and entertainment index rate of change over the previous five months.

In another embodiment of the invention, a travel and entertainment income standardized momentum trend risk index (number and dollar) may be calculated in accordance with an aspect of the invention. The travel and entertainment income standardized momentum trend risk may refine the travel and entertainment momentum trend risk index based on income information. Customers with below average income levels may have higher travel and entertainment income standardized momentum trend risk index values. The travel and entertainment income standardized momentum trend risk index may be calculated by multiplying the travel and entertainment momentum trend risk index by the average income for all customers then dividing by the income for the specified customer.

In an aspect of the invention, a necessity index (number and dollar) may be calculates in accordance with an aspect of the invention. The necessity index estimates the percent of customer spending that is a necessity. The sum of number and dollar amount for transactions believed to be necessities (shown in the listing below) are divided by the sum of the number and dollar amount for all transactions.
  Necessity
    Debt Payments
    Gas Stations
    Grocery Stores
    Healthcare
    Insurance
    Mortgage Debt Payments
    Utilities—Household electricity, gas, water In another embodiment of the invention, a necessity risk index (number and dollar) may be calculated in accordance with an aspect of the invention. The necessity risk index may adjust the necessity index using information on income and debt payments. Customers with a large percent of their income required for debt payments may have a higher necessity risk index than customers with the same necessity index value, but may require a small percent of their income for debt payments. The necessity risk index may be calculated by multiplying the necessity index by the percent of income required for debt payments.

In another embodiment of the invention, a necessity income standardized risk index (number and dollar) may be calculated in accordance with an aspect of the invention. The necessity income standardized risk index may refine the necessity risk index based on income information. Customers with below average income levels may have higher necessity income standardized risk index values. The necessity income standardized risk index may be calculated by multiplying the necessity risk index by the average income for all customers then divided by the income for the specific customer.

In another embodiment of the invention, a necessity five month momentum index (number and dollar) may be calculated in accordance with an aspect of the invention. The necessity five month momentum index may refine the necessity index based on the five month rate of increase/decrease. The necessity five month momentum index may be larger than the necessity index for customers with increasing necessity index values. The necessity five month momentum index may be smaller than the necessity index for customers with decreasing necessity index values. The necessity five month momentum index may be calculated by multiplying the necessity index by the necessity index rate of change over the previous five months.

In another embodiment of the invention, a necessity five month momentum risk index (number and dollar) may be calculated in accordance with an aspect of the invention. The necessity five month momentum risk index may refine the necessity risk index based on the five month rate of increase/decrease. The necessity five month momentum risk index may be larger than the necessity risk index for customers with increasing necessity index values. The necessity five month momentum risk index may be smaller than the necessity risk index for customers with decreasing necessity index values. The necessity five month momentum risk index may be calculated by multiplying the necessity risk index by the necessity index rate of change over the previous five months.

In another embodiment of the invention, a necessity income standardized five month momentum risk index (number and dollar) may be calculated in accordance with an aspect of the invention. The necessity income standardized five month momentum risk index may refine the necessity five month momentum risk index based on income information. Customers with below average income levels may have higher necessity income standardized five month momentum risk index values. The necessity income standardized five month momentum risk index may be calculated by multiplying the necessity five month momentum risk index by the average income for all customers then divided by the income for the specific customer.

In another embodiment of the invention, a necessity three month momentum index (number and dollar) may be calculated in accordance with an aspect of the invention. The necessity three month momentum index may refine the necessity index based on the three month rate of increase/decrease. The necessity three month momentum index may be larger than the necessity index for customers with increasing necessity index values. The necessity three month momentum index may be smaller than the necessity index for customers with decreasing necessity index values. The necessity three month momentum index may be calculated by multiplying the necessity index by the necessity index rate of change over the previous three months.

In another embodiment of the invention, a necessity three month momentum risk index (number and dollar) may be calculated in accordance with an aspect of the invention. The necessity three month momentum risk index may refine the necessity risk index based on the three month rate of increase/decrease. The necessity three month momentum risk index may be larger than the necessity risk index for customers with increasing necessity index values. The necessity three month momentum risk index may be smaller than the necessity risk index for customers with decreasing necessity index values. The necessity three month momentum risk index may be calculated by multiplying the necessity risk index by the necessity index rate of change over the previous three months.

In another embodiment of the invention, a necessity income standardized three month momentum risk index (number and dollar) may be calculated in accordance with an aspect of the invention. The necessity income standardized three month momentum risk index may refine the necessity three month momentum risk index based on income information. Customers with below average income levels may have higher necessity income standardized three month momentum risk index values. The necessity income standardized three month momentum risk index may be calculated by multiplying the necessity three month momentum risk index multiplied by the average income for all customers then divided by the income for the specific customer.

In another embodiment of the invention, a necessity momentum trend index (number and dollar) may be calculated in accordance with an aspect of the invention. The necessity momentum trend index may refine the necessity index based on the ratio of three month to five month rate of increase/decrease. The necessity momentum trend index may be larger than the necessity index for customers with necessity three month momentum index values that are greater than the necessity five month momentum index. The necessity momentum trend index may be smaller than the necessity index for customers with necessity three month momentum index values that are less than the necessity five month momentum index. The necessity momentum trend index may be calculated by multiplying the necessity index by the necessity index rate of change over the previous three months then divided by the necessity index rate of change over the previous five months.

In another embodiment of the invention, a necessity momentum trend risk index (number and dollar) may be calculated in accordance with an aspect of the invention. The necessity momentum trend risk index may refine the necessity risk index based on the ratio of three month to five month rate of increase/decrease. The necessity momentum trend risk index may be larger than the necessity index for customers with necessity three month momentum risk index values that are greater than the necessity five month momentum risk index. The necessity momentum trend risk index may be smaller than the necessity index for customers with necessity three month momentum index values that are less than the necessity five month momentum index. The necessity momentum trend risk index may be calculated by multiplying the necessity risk index by the necessity index rate of change over the previous three months then divided by the necessity index rate of change over the previous five months.

In another embodiment of the invention, a necessity income standardized momentum trend risk index (number and dollar) may be calculated in accordance with an aspect of the invention. The necessity income standardized momentum trend risk index may refine the necessity momentum trend risk index based on income information. Customers with below average income levels may have higher necessity income standardized three month momentum risk index values. The necessity income standardized momentum trend risk index may be calculated by multiplying the necessity momentum trend momentum risk index by the average income for all customers then divided by the income for the specific customer.

In an aspect of the invention, a relative customer purchase risk profile may be calculated. The relative customer purchase risk profile may be FICO weighted. The relative customer purchase risk profile index may assign a comparative risk index to each customer's monthly purchase pattern. In a first step, category weighted FICO score is calculated for each transaction category each month. The weighted FICO score for a given category k is computed from the n transactions occurring within that category, their corresponding dollar amounts, and the FICO score of the cardholder making each transaction. The computation is as follows:

$$\text{Category Weighted } FICO_k = \frac{\sum_{1}^{n_k} \text{Transaction Amount}_i \times FICO_i}{\sum_{1}^{n_k} \text{Transaction Amount}_i}$$

In a second step, a customer purchase risk profile is calculated. A monthly customer purchase risk profile for a given cardholder (l) is computed from the m purchase transactions incurred by that customer for the month, the category weighted FICO scores for the transaction categories where charges were incurred, and the dollar amounts of the transactions under those categories. The computation is as follows:

$$CustomerPurchaseRiskProfile_l = \frac{\sum_{1}^{m_l} \text{Transaction Amount}_i \times CategoryWeightedFICO_i}{\sum_{1}^{m_l} \text{Transaction Amount}_i}$$

In a third step, an average customer risk profile is calculated for a given FICO score each month. Once the customer purchase risk profile scores are computed for all customers transacting in a given month, a plot of profile score versus customer FICO can be constructed and a curve fit to estimate the profile score per FICO. Curve fitting may be done using a number of standard plotting and statistical packages that typically solve for the curve fit using ordinary least squares.

Finally, in a fourth step, the relative customer purchase profile may be calculated. The relative customer purchase risk profile is computed by dividing the customer Purchase risk profile (step 2) by the average customer purchase risk profile (step 3).

In another aspect of the invention, a relative customer purchase risk profile may be calculated. The relative customer purchase risk profile may be default rate weighted. The relative customer purchase risk profile may assign a comparative risk index to each customer's monthly purchase pattern.

In a first step, a category weighted default rate may be calculated for each transaction category each month. The weighted default rate for given category k may be computed from the n customers making transactions within that category, the default status of each those customers (0 for non-default, 1 for default), along with the total transaction amount for each of those customers within the category. The computation is as follows:

Category Weighted Default Rate$_k$ =

$$\frac{\sum_{1}^{n_k} \text{Total Transaction Amount}_i \times \text{Default Status}_i}{\sum_{1}^{n_k} \text{Total Transaction Amount}_i}$$

In a second step, a customer purchase risk profile may be calculated. The monthly customer purchase risk profile for a given cardholder (l) is computed from the m purchase transactions incurred by that customer for the month, the category weighted default rate for the transaction categories where charges were incurred, and the dollar amounts of the transactions under those categories. The computation is as follows:

$CustomerPurchaseRiskProfile_l =$ $$\frac{\sum_{1}^{m_l} \text{Transaction Amount}_j \times CategoryWeightedDefaultRate_j}{\sum_{1}^{m_l} \text{Transaction Amount}_j}$$

In a third step, an average customer risk profile is calculated for a given FICO score each month. Once the customer purchase risk profile scores are computed for all customers transacting in a given month, a plot of profile score versus customer FICO may be constructed and a curve fit to estimate the profile score per FICO. Curve fitting may be done using a number of standard plotting and statistical packages that typically solve for the curve fit using ordinary least squares.

Finally, in a fourth step a relative customer purchase profile may be calculated. The relative customer purchase risk profile is computed by dividing the customer purchase risk profile (step 2) by the average customer purchase risk profile (step 3).

Although not required, one of ordinary skill in the art will appreciate that various aspects described herein may be embodied as a method, a data processing system, or as a computer-readable medium storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of electromagnetic waves traveling through signal-conducting media such as metal wires, optical fibers, and/or wireless transmission media (e.g., air and/or space).

Aspects of the invention have been described in terms of illustrative embodiments thereof Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A computer-assisted method comprising:
   receiving transactional data corresponding to transactions occurring at an institution by a user;
   storing, in computer memory by the processor, the transactional data;
   calculating, using a computer processor, a cash flow statement based on the transactional data;
   calculating, using the computer processor, a net worth statement using the transactional data, including calculating an amount of assets held by the user at a different institution;
   calculating, using the computer processor, a transactional index;
   analyzing, using the processor, the transactional data to determine if the user's account is a primary transactional account;
   weighting, using the processor, the calculated cash flow statement and the net worth statement based on whether the user's account is a primary transactional account; and
   calculating, using the processor, a share of wallet for the customer indicating a percentage of a user's financial requirement filled by the institution;
   weighting, using the processor, the share of wallet along with the generated cash flow and net worth statement; and
   determining, using the processor, credit worthiness based on the weighted share of wallet, cash flow, net worth statement, and transactional index.

2. The method of claim 1, further including originating a loan based on the determined credit worthiness of the user.

3. The method of claim 1, further comprising:
   determining a FICO score for the user;
   weighting the FICO score along with the generated cash flow and net worth statement; and
   determining credit worthiness based on the weighted FICO score, cash flow, and net worth statement.

4. The method of claim 1, wherein the transactional data comprises credit card transactions, debit card transactions, and a dividend deposit transaction.

5. The method of claim 1, wherein the transactional data comprises electronic bill payment transactions.

6. The method of claim 1, wherein the transactional data comprises checking and saving account transactions, and interest deposit transaction.

7. The method of claim 6, wherein the checking and saving account transactional data is analyzed for life event changes to the user.

8. The method of claim 6, wherein the checking account transactional data is analyzed to determine whether the checking account is a primary checking account.

9. The method of claim 1, wherein the transaction index comprises at least one of: a luxury ratio index, a discretionary index, a travel and entertainment index, and a necessity index.

10. The method of claim 1, wherein the transaction index comprises a relative customer purchase risk profile index based on transaction costs during one month and a weighted FICO score for the transaction categories that incurred charges during that one month.

11. The method of claim 1, further comprising:
   generating a categorized transactional index based on the transactional data;
   determining credit worthiness based on the weighted share of wallet, cash flow statement, net worth statement, and categorized transactional index, where the net worth statement includes the account outside of the institution; and
   originating a loan based on the determined credit worthiness of the user.

12. A non-transitory computer-readable medium storing computer-executable instructions, which when executed by a processor, cause a computing apparatus to:
   store received transactional data corresponding to transactions occurring at an institution by a user;
   calculate a cash flow statement based on the transactional data;

calculate a net worth statement using the transactional data, including calculating an amount of assets held by the user at a different institution;

calculate a transactional index;

analyze the transactional data to determine if the user's account is a primary transactional account;

weight the calculated cash flow statement and the net worth statement based on whether the user's account is a primary transactional account;

calculate a share of wallet for the customer indicating a percentage of a user's financial requirement filled by the institution;

weight the share of wallet along with the generated cash flow and net worth statement; and determine credit worthiness based on the weighted share of wallet, cash flow, net worth statement, and transactional index.

13. The computer-readable medium of claim 12, storing further computer-executable instructions, which when executed by the processor, cause the computing apparatus to:

generate an indication of a loan application being originated based on the determined credit worthiness of the user;

wherein the transactional data comprises at least one of:
credit card transactions, debit card transactions, and a dividend deposit transaction;
electronic bill payment transactions; and
checking and saving account transactions, and interest deposit transaction.

14. The computer-readable medium of claim 12, storing further computer-executable instructions, which when executed by the processor, cause the computing apparatus to:

determine a FICO score for the user;

weight the FICO score along with the generated cash flow and net worth statement; and determine credit worthiness based on the weighted FICO score, cash flow, and net worth statement;

wherein the transaction index comprises at least one of: a luxury ratio index, a discretionary index, a travel and entertainment index, and a necessity index.

15. The computer-readable medium of claim 12, storing further computer-executable instructions, which when executed by the processor, cause the computing apparatus to:

generate a categorized transactional index based on the transactional data;

determine credit worthiness based on the weighted share of wallet, cash flow statement, net worth statement, and categorized transactional index, where the net worth statement includes the account outside of the institution; and generate an indication of a loan application being originated based on the determined credit worthiness of the user.

16. A computer-assisted method comprising:

storing, in computer memory, received transactional data corresponding to transactions associated with a user;

categorizing the transactional data into numerous categories;

calculating, by a computer processor, a luxury index based on a ratio of a dollar amount of luxury transactions to a dollar amount of necessity transactions;

calculating, by the processor, a necessity income standardized momentum trend risk index for the user based on income information about the user;

determining, by the processor, credit worthiness of the customer based on the numerous categories of the transactional data and the necessity income standardized momentum trend risk index of the user; and generating, by the processor, an indication of an approved loan application based on the determined credit worthiness of the user.

17. The method of claim 16, comprising:
calculating a FICO score for the user; and
adjusting the FICO score based on the credit worthiness determined of the user.

18. The method of claim 16, wherein the luxury index is at least one of:
income standardized;
adjusted based on a luxury ratio three month momentum index;
adjusted based on a luxury ratio five month momentum index;
adjusted based on a luxury ratio momentum trend index.

19. The method of claim 16, wherein the luxury transactions comprise transactions related to airlines, entertainment, rental cars, and restaurants.

20. The method of claim 16, wherein the necessity transactions comprise transactions related to gas stations, grocery stores, and healthcare.

* * * * *